United States Patent
Gruhler

(10) Patent No.: US 12,123,765 B2
(45) Date of Patent: Oct. 22, 2024

(54) VIBRATION SENSOR WITH AN ALIGNING ELEMENT AND METHOD FOR ALIGNING THE OSCILLATION PROPERTIES OF TWO PRONGS

(71) Applicant: VEGA Grieshaber KG, Wolfach (DE)

(72) Inventor: Holger Gruhler, Tuningen (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 18/349,558

(22) Filed: Jul. 10, 2023

(65) Prior Publication Data
US 2024/0060818 A1     Feb. 22, 2024

(30) Foreign Application Priority Data
Jul. 11, 2022 (DE) ...................... 10 2022 117 169.8

(51) Int. Cl.
*G01H 17/00* (2006.01)
(52) U.S. Cl.
CPC .................................... *G01H 17/00* (2013.01)
(58) Field of Classification Search
CPC ....................................................... G01H 17/00
See application file for complete search history.

(56) References Cited

U.S. PATENT DOCUMENTS

| 4,374,472 A | * | 2/1983 | Nishimura | H04R 17/02 73/35.11 |
| 4,922,745 A | * | 5/1990 | Rudkin | G01N 11/16 73/32 A |
| 5,001,426 A | * | 3/1991 | Frey | G01R 33/1215 324/259 |

FOREIGN PATENT DOCUMENTS

| DE | 102004018506 A1 | * | 11/2005 | ........... B06B 1/0246 |
| DE | 10 2015 114 286 A1 | | 3/2017 | |
| DE | 10 2015 122 648 A1 | | 6/2017 | |
| DE | 10 2020 116 299 A1 | | 6/2020 | |
| DE | 102020127514 B3 | * | 3/2022 | |
| WO | 2020/249317 A1 | | 12/2020 | |

OTHER PUBLICATIONS

EP 23180148.1 European Search Report dated Nov. 27, 2023.
DE 10 2022 117 169.8 Office Action mailed Mar. 28, 2023.
DE 10 2022 117 169.8 Office Action mailed Mar. 28, 2023 translation.
DE 10 2022 117 169.8 Decision to Grant mailed Jun. 6, 2023 with translation.

* cited by examiner

*Primary Examiner* — Tarun Sinha
*Assistant Examiner* — Drexel Alejandro Venero
(74) *Attorney, Agent, or Firm* — Wood Herron & Evans LLP

(57) ABSTRACT

The invention relates to a vibration sensor with a housing and a mechanical oscillator, with a first tine and a second tine arranged thereon, and a drive for exciting the mechanical oscillator, wherein the drive is fixed relative to the mechanical oscillator by means of a yoke, wherein the yoke defines at least one yoke cavity, wherein a shoulder of at least one tine defines a tine cavity, wherein the yoke cavity and the tine cavity are aligned with one another, and wherein a balancing element is moveably arranged in the yoke cavity, so that it can be arranged at least partially in the tine cavity. The invention further relates to a method for comparing the vibration properties of two tines of a vibration sensor.

10 Claims, 3 Drawing Sheets

VIBRATION SENSOR WITH AN ALIGNING ELEMENT AND METHOD FOR ALIGNING THE OSCILLATION PROPERTIES OF TWO PRONGS

RELATED APPLICATIONS

This application claims priority to German Application No. DE 10 2022 117 169.8 filed Jul. 11, 2022, which is hereby incorporated by reference in its entirety.

FIELD OF THE INVENTION

The invention relates to a vibration sensor with an aligning element and further relates to a method for aligning the oscillation properties of two prongs of a vibration sensor.

BACKGROUND OF THE INVENTION

Field devices that serve for recording and/or influencing process variables are often used in process automation engineering. Filling level measuring devices, limit level measuring devices and pressure measuring devices with sensors recording the respective process variables filling level, limit level or pressure are examples of such field devices. Such field devices are frequently connected to higher-level units, e.g. to guidance systems or control systems. These higher-level units serve for controlling, visualizing and/or monitoring processes. The field devices known from the prior art generally have a housing, a sensor and an electronics unit disposed in the housing.

Among others, vibration sensors that are used as vibration limit switches, for instance, are known from the prior art as examples for such field devices. Generally, the vibration sensor has a mechanical oscillator (typically a diaphragm), which can be excited to oscillate by means of a drive unit and by means of which prongs arranged on the mechanical oscillator can be excited to oscillate. Depending on the level to which the prong is covered with a filling material, and depending on the viscosity of this filling material, the prongs, and thus the mechanical oscillator, oscillate with a characteristic frequency and amplitude that can be detected by the vibration sensor and converted into a measurement signal.

In a vibration sensor with two prongs (fork-shaped vibration sensor), it may occur that the two prongs do not oscillate with an identical frequency and amplitude (e.g. due to an asymmetric cast diaphragm, an asymmetric welding attachment of the prongs or also asymmetries in the drive unit).

However, in order to enable an oscillation of the prongs that is smooth (symmetric) in relation to the clamping to the diaphragm as well as a reliable operation, it is necessary to adjust the resonant frequency and the oscillation amplitude of the two prongs such that they are identical.

So far, the rigidity of one prong is manipulated for this purpose, using, inter alia, a milling process, wherein material is removed by milling from a prong until both prongs oscillate with the same frequency and the same amplitude.

The drawback of this milling process is that it is time-consuming, because friction and heat are produced by the mechanical processing. In order to be able to reliably measure the frequency as the quantity to be aligned, waiting times or additional cooling are required after milling. Moreover, a visible change on the prong, which is within an optically visible range, is produced by the milling.

SUMMARY OF THE INVENTION

It is the underlying object of the invention to provide a vibration sensor with two prongs and a method for aligning the oscillation properties of two prongs, by means of which a simple alignment of the oscillation behavior of the two prongs is made possible.

A vibration sensor according to the invention has a housing, and also a mechanical oscillator. The mechanical oscillator is, in particular, a diaphragm. A first prong and a second prong are arranged on the mechanical oscillator. The two prongs are arranged, spaced apart from one another, on the mechanical oscillator, and this is a fork-shaped vibration sensor. The vibration sensor has a drive unit for exciting the mechanical oscillator.

Here, the drive unit is attached to the housing via a yoke and fixed relative to the mechanical oscillator by means of the yoke. Here, yoke refers to a part which extends transversely across the drive unit on the side of the drive unit opposite the mechanical oscillator, and which serves for connecting the drive unit and serves for clamping the drive unit relative to the diaphragm. In particular, the yoke is a separate part. Preferably, the yoke is formed to be cup-shaped and, viewed in cross section, U-shaped, and is supported on the mechanical oscillator with one side wall. In particular, the yoke is screwed to the mechanical oscillator. A base surface of the yoke extends in the transverse direction of the vibration sensor. In particular, the base surface has a central through-hole in which a biasing bolt is arranged, which serves for attaching and clamping the drive unit relative to the mechanical oscillator.

Here, the yoke has at least one yoke cavity. In particular, the yoke cavity extends in the side wall of the yoke and over the entire height of the side wall. In addition, a root of at least one prong has a prong cavity. The root is in this case the portion of the prong adjacent to the mechanical oscillator. In particular, the root extends over at most 30% of the length of the prong, and preferably over at most 20% or at most 10% of the prong. In particular, the root may be thickened compared with the rest of the basic body of the prong. The at least one yoke cavity and the corresponding prong cavity are aligned with one another. In particular, there is in the mechanical oscillator an opening which permits a passage between the yoke cavity and the prong cavity. An aligning element is displaceably arranged in the yoke cavity such that it can be at least partially arranged in the prong cavity.

By arranging an aligning element that can be displaced through the yoke into the root of the at least one prong, the rigidity of the root of the at least one prong is changed directly at the mechanical oscillator such that the oscillation frequency and the oscillation amplitude of the prong are thus also changed. The aligning element can be guided particularly well and also displaced easily through the yoke or the yoke cavity. In the event no alignment is necessary, the aligning element can only be placed in the yoke cavity or removed in a simple manner. In this case, the root is designed such that the insertion of the aligning element affects the rigidity of the entire prong, i.e., the root is configured to be less massive in comparison with the aligning element.

Another advantage—compared to milling—is that the position of the aligning bolt can be corrected, whereas material that has been removed by milling no longer makes a correction possible, or can only be compensated by another milling process on the opposite prong.

In a practical embodiment of the vibration sensor, the yoke cavity is configured as a passage and has an internal thread. In particular, the passage is formed by a hollow screw. The aligning element, corresponding thereto, has an external thread. By screwing the aligning element into the yoke cavity, the position of the aligning element can be adjusted particularly accurately. In particular, the aligning element has a fine thread in order to be able to adjust and position the aligning element particularly accurately.

In particular, the at least one yoke cavity is formed by a hollow screw. Preferably, the hollow screw simultaneously serves for attaching the yoke to the mechanical oscillator. Such an arrangement is particularly compact because the additional yoke cavity for arranging the aligning element is formed within the typically provided attachment portion of the yoke.

If the yoke cavity has an internal thread, the aligning element, in particular, correspondingly is a threaded bar. Then, the threaded bar can be inserted into the hollow screw in a simple manner and be displaced from the yoke cavity at least partially into the prong cavity for aligning the oscillation properties.

In another practical embodiment, the prong cavity is formed as a blind hole. In particular, the prong cavity extends only over the root of the prong so that the prong remains otherwise unchanged, and the prong remains as mechanically intact as possible. Using a blind hole only in the root, the displaceability of the aligning element is limited to the root of the prong. In addition, the prong cavity may extend at an angle to the oscillation axis of the prong.

Alternatively, the prong cavity may also extend beyond the root of the prong into the basic body of the prong. Thus, the range over which the oscillation properties can be adjusted by means of the aligning element is expanded, and prongs with very different oscillation properties can also be aligned.

The prong cavity may have a thread into which the aligning element can be screwed and, accordingly, can be fixed in the prong cavity. Alternatively, the aligning element can be tightly guided in the yoke cavity or also be glued into it without a thread. If the aligning element is configured as a threaded bar, it can also be configured without a thread in a lower region for the latter two cases.

In another practical configuration of the vibration sensor, the first prong and the second prong have in their roots one prong cavity each, and corresponding thereto, one yoke cavity aligned therewith is in each case formed in the yoke. In particular, the yoke in that case has two yoke cavities each extending over the height of a side wall. In particular, the two yoke cavities are formed by a hollow screw for attaching the yoke to the mechanical oscillator. In that case, an aligning element may be arranged in one yoke cavity, or even in both, and the respective aligning element can be introduced into the root of a prong (or of both prongs) as needed. Because of the possibility of adapting the oscillation properties of both prongs, the flexibility is increased in that a desired oscillation frequency and amplitude can now be adjusted within a certain range, and both prongs can be tuned thereto.

The invention also relates to a method for aligning the oscillation properties, i.e. particularly the resonant frequency and amplitude, of two prongs of a vibration sensor. In particular, this is a vibration sensor as described above, with two prongs and a yoke. The rigidity of the root of at least one prong is changed by an aligning element being inserted through a yoke cavity into a prong cavity, which is aligned therewith, in the root of at least one prong. Depending on how far the aligning element is inserted into the prong, the oscillation properties of the prong change.

With regard to the further advantages, reference is made to the above description.

In particular, the aligning element is screwed into the yoke cavity and the prong cavity. Thus, the position of the aligning element can be adjusted particularly accurately and in a controlled manner. In particular, the yoke cavity is formed by a hollow screw, and the aligning element is a threaded bar, which is inserted into the hollow screw and screwed thereinto.

The position of the aligning element can be fixed after the alignment of the oscillation properties. This may be done, for instance, by pouring in a glue or thread-securing glue. In particular, the glue may be filled in prior to the alignment and then be cured.

Other practical embodiments are described below in connection with the Figures. In the Figures:

DETAILED DESCRIPTION OF THE DRAWINGS

Figure 1:
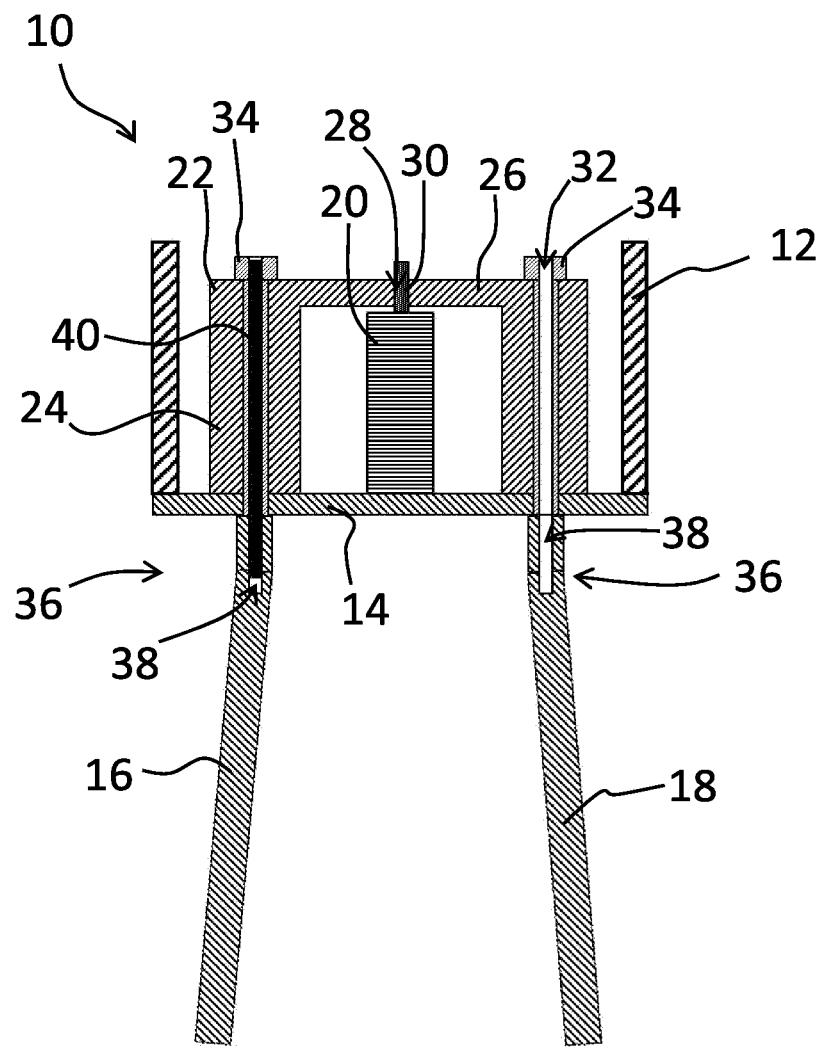
FIG. 1 shows a vibration sensor according to first embodiment, with two prongs, a yoke and an aligning element in a schematic cross-sectional illustration.

A fork-shaped vibration sensor 10 according to a first embodiment is shown in FIG. 1. The vibration sensor 10 comprises a housing 12 with a mechanical oscillator 14—a diaphragm in this case. A first prong 16 and a second prong 18 are arranged side-by-side on the mechanical oscillator 14.

A drive unit 20 for exciting the mechanical oscillator 14 is arranged in the housing 12. The drive unit 20 is connected to the mechanical oscillator 14 and is capable of making the latter oscillate and also of detecting oscillations of the mechanical oscillator 14.

Further, a yoke 22 is arranged in the housing 12. The yoke 22 has a cup-shaped configuration and, viewed in cross section, is U-shaped. The yoke 22 laterally surrounds the drive unit 20 and on the side opposite the mechanical oscillator 14. The yoke 22 has a peripherally extending side wall 24 and a base surface 26 extending transversely to the axial direction (z-direction).

The drive unit 20 is clamped relative to the mechanical oscillator 14 via the yoke 22. For this purpose, the yoke 22 has a central through-hole 28 through which a bolt 30 or a grub screw is guided in order to clamp the drive 20 in the direction of the mechanical oscillator 14.

In addition, the yoke 22 has in the side wall 24 two yoke cavities 32, which in the present case extend across the entire height of the side wall 24 up to the mechanical oscillator 14. In the present case, the yoke cavities 32 are each formed by a hollow screw 34, which at the same time serves for attaching the yoke 22 to the mechanical oscillator 14. Here, the yoke cavity 32 in each case extends through the mechanical oscillator 14. The hollow screw 34 has an internal thread.

Prong cavities 38 are formed in each case in a root 36 of the prongs 16, 18, aligned in each case with one yoke cavity 32. The prong cavities 38 are each formed as a blind hole.

In the first prong 16, which is here disposed on the left, a displaceable aligning element 40 is arranged in the yoke cavity 32 and the prong cavity 38 aligned therewith. Here, the aligning element 40 is a threaded bar.

A method for aligning the oscillation properties is described below with reference to FIGS. 2, 3 and 4.

For describing further embodiments, the same reference numerals as in the description of the first embodiment are used below for identical or at least functionally identical components.

Figure 2:
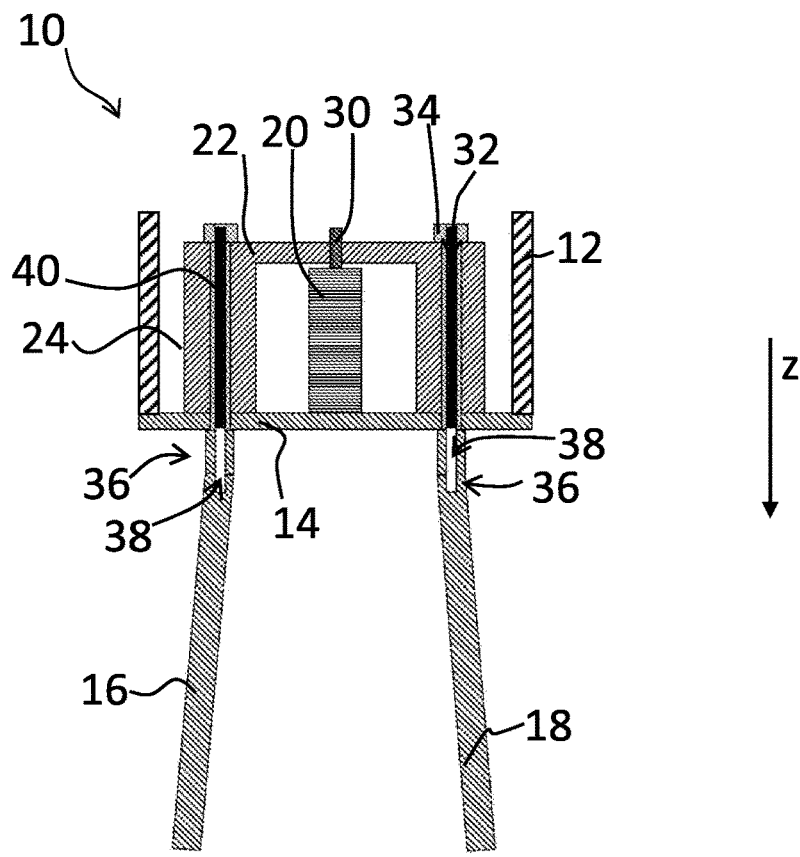
FIG. 2 shows a vibration sensor according to second embodiment in a schematic cross-sectional illustration, with two prongs, a yoke and two aligning elements, with the aligning elements being arranged in an initial position.
Figure 3:
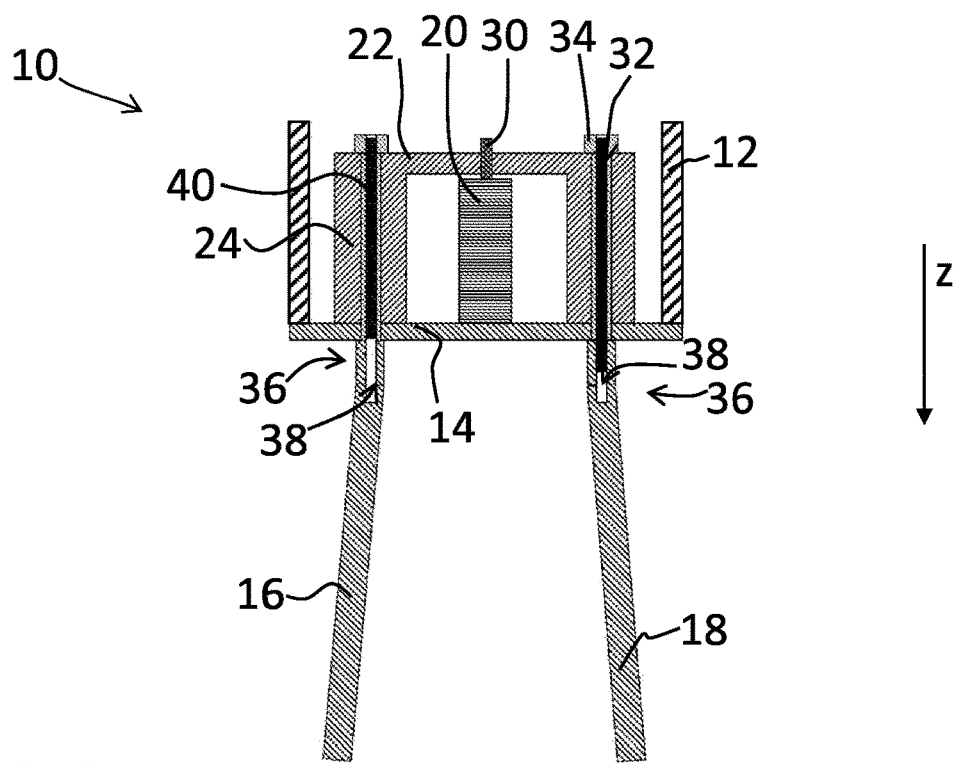
FIG. 3 shows the vibration sensor from FIG. 2 with two aligning elements, wherein one aligning element is arranged in a second position shifted from the initial position.

A second embodiment of a vibration sensor 10 is shown in FIGS. 2 and 3. It substantially matches the first embodiment, with the exception that an aligning element 40 is arranged in the yoke cavities 32 of both prongs 16, 18.

In FIG. 2, both aligning elements 40 are only positioned in the yoke cavity 32 and do not protrude any farther in the z-direction than up to the mechanical oscillator 14. The aligning element 40 are arranged in an initial position.

In contrast, the right-hand aligning element 40 in the right-hand prong 18 is shifted farther in the z-direction in FIG. 3, and now protrudes into the prong cavity 38 in the root 36 of the right-hand prong 18. Accordingly, the right-hand aligning element 40 is screwed into the prong cavity 38 in the z-direction. The left-hand aligning element 40 in the left-hand prong 16 still has the same position as in FIG. 2.

Figure 4:
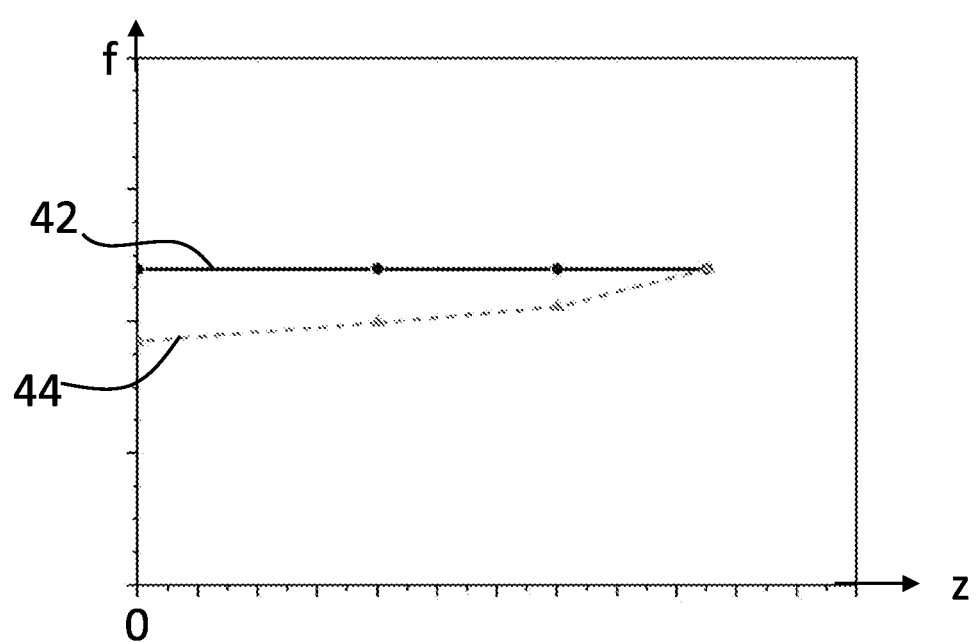
FIG. 4 shows a diagram showing the change of the frequency of the two prongs in relation to the changed position of the aligning element.

FIG. 4 makes clear what happens in the respective prong 18 by shifting or screwing in the aligning element 40. In FIG. 4, the displacement "z" of the aligning element 40 in the z-direction is plotted on the x-axis. The resonant frequency "f" of the prongs 16, 18 is plotted in the y-direction.

The curve 42 (solid line) in this case represents the resonant frequency of the first prong 16, in this case of the left-hand prong. The curve 44 (dashed line) in this case represents the resonant frequency of the second, right-hand prong 18.

As can be easily seen, the resonant frequencies of the two prongs 16, 18 deviate from one another at z=0. Given an identical coverage (or no coverage), the first left-hand prong 16 has a higher resonant frequency than the second right-hand prong 18.

In order to align and attune the two resonant frequencies, the aligning element 40, for changing the rigidity of the root 38 of the prong 18, is screwed thereinto, as shown in FIG. 3. The farther the aligning element is screwed in the z-direction, the more the resonant frequency in the curve 44 aligns with the resonant frequency of the first prong 16. The aligning element 40 is inserted into the second prong 18 until the resonant frequency of the second prong 18 matches the resonant frequency of the first prong 16.

REFERENCE SIGNS LIST

10 Vibration sensor
12 Housing
14 Mechanical oscillator (diaphragm)
16 First prong
18 Second prong
20 Drive unit
22 Yoke
24 Side wall
26 Base surface
28 Through-hole
30 Bolt
32 Yoke cavity
34 Hollow screw
36 Root
38 Prong cavity
40 Aligning element
42 Frequency curve
44 Frequency curve
f Resonant frequency
z Axial direction

The invention claimed is:

1. A vibration sensor with a housing and with a mechanical oscillator, wherein a first prong and a second prong are arranged on the mechanical oscillator, and with a drive unit for exciting the mechanical oscillator, wherein the drive unit is fixed relative to the mechanical oscillator by means of a yoke, wherein the yoke has at least one yoke cavity, and wherein a root of at least one prong has a prong cavity, and wherein the yoke cavity and the prong cavity form an opening with one another permitting passage of an aligning element through the yoke cavity and the prong cavity, and wherein the aligning element is displaceably arranged in the yoke cavity such that it can be at least partially arranged in the prong cavity for aligning the oscillation properties of the two prongs.

2. The vibration sensor according to the claim 1, wherein the yoke cavity is configured as a passage and has an internal thread, and the aligning element, corresponding thereto, an external thread.

3. The vibration sensor according to claim 1, wherein the yoke cavity is formed by a hollow screw, and the hollow screw at the same time serves for attaching the yoke to the mechanical oscillator.

4. The vibration sensor according to claim 1, wherein the aligning element is a threaded bar.

5. The vibration sensor according to claim 1, wherein the prong cavity is configured as a blind hole.

6. The vibration sensor according to claim 1, wherein the prong cavity has a thread.

7. The vibration sensor according to claim 6, wherein the first prong and the second prong have in their roots one prong cavity each, and, corresponding thereto, one yoke cavity aligned therewith in each case formed in the yoke.

8. A method for aligning the oscillation properties of two prongs of a vibration sensor, wherein the rigidity of a root of at least one prong is changed by an aligning element being inserted through a yoke cavity into a prong cavity, wherein the yoke cavity and prong cavity together form an opening permitting passage of the aligning element, wherein the aligning element is inserted in the root of the at least one prong until the resonant frequency of the second prong matches the resonant frequency of the first prong.

9. The method according to the claim 8, wherein the aligning element is screwed into the yoke cavity and the prong cavity.

10. The method according to claim 8, wherein the position of the aligning element is fixed after the alignment of the oscillation properties.

* * * * *